United States Patent Office 2,815,293
Patented Dec. 3, 1957

2,815,293

INSULATING FINISHING CEMENT AND STRUCTURAL MATERIAL

Merwyn C. Randall, Philadelphia, Pa., and George S. Gethen, Collingswood, N. J.; John V. Randall, executor of the estate of said Merwyn C. Randall, deceased, and Edna G. Gethen, executrix of the estate of said George S. Gethen, deceased, assignors to Mary I. Randall, Notre Dame, Ind., and Edna G. Gethen, Collingswood, N. J.

No Drawing. Application January 31, 1956, Serial No. 562,608

6 Claims. (Cl. 106—97)

This invention relates to a white insulating finishing cement, and structural material, and more particularly concerns an insulating finishing cement of the general character described in our issued Patent No. 2,574,843, granted November 13, 1951.

It is an object of this invention to provide an insulating finishing cement which has all of the desirable and advantageous characteristics of the cement disclosed and claimed in the patent referred to above, and which in addition has the advantage that it has a white color which is compatible with the color of conventional magnesia insulation, and which can be used in conjunction with such insulation. Still another object of this invention is to provide an insulating finishing cement which has improved workability and which may be used either indoors or outdoors, which is quick setting, and which is not affected by weather such as rainfall, moisture, snow, ice and the like.

Still another object of this invention is to provide a quick setting insulating finishing cement having excellent insulating properties and having the ability to expand and contract with varying temperatures, and which has a white color rendering it readily adaptable for various uses. In this connection, it is a further object of this invention to provide an insulating finishing cement which contains a substantial proportion of fly ash having a rather dark gray color, but which cement has a white color notwithstanding the dark gray color of this important ingredient. Other objects and advantages of this invention, including the lower cost and ready adaptability of the same, will further appear hereinafter.

It has now been discovered that an insulating finishing cement of the character indicated above may be prepared by mixing specific proportions of a thermal insulating material such as mineral wool, for example, a setting cement such as white Portland cement for example, a pozzolan cement such as fly ash plus clay or fly ash plus clay plus diatomaceous earth for example, and a plasticizer such as bentonite for example.

Although the important ingredients of our new composition may be mixed together in a wide variety of proportions, it is particularly preferred in accordance with this invention to utilize the following ingredients in percentages by weight as follows:

| | Percent by weight (dry basis) |
|---|---|
| Thermal insulating material (mineral wool, for example) | 20–40 |
| Setting cement | 10–35 |
| Pozzolan component | 10–50 |
| Plasticizer | 5–30 |

The raw materials of the compositions of our invention consist essentially of commercial materials which are normally available at relatively low cost. The cementitious component, or setting cement, is preferably white Portland cement which is well known and readily available. White Portland cement is substantially free of iron, and contains less than about 0.4% by weight $Fe_2O_3$. The thermal insulating component of the composition preferably comprises a mineral wool, which term is used generically herein and which includes rock wool, slag wool, and various similar mineral wool compositions, all of which are well known in the art and readily available.

Another component of the composition of this invention is a finely divided fly ash, or equivalent pozzolan. Fly ash is the finely divided ash residue produced by the combustion of pulverized coal, which ash is carried off with the gases exhausted from a furnace in which the coal is burned, and which is collected from these gases usually by means of suitable electrical or mechanical precipitators. It is recognized in the literature that fly ash is a pozzolanic material. Other equivalent pozzolans are intended to be included within the meaning of the term "fly ash" as used herein.

The fly ash pozzolan is preferably combined with a clay or clay-like material in accordance with this invention. Various forms of clay of the kaolin group (hydrous silicate of alumina) are suitable, and the art distinguishes sharply from bentonite or bentonite clay (which usually contain montmorillonite), as will further appear hereinafter. Among suitable clays are the ball clays such as Pennsylvania or Tennessee ball clay, china clays and bond clays, which contain minerals of the kaolin group such as kaolinite, dickite, nacrite, metahalloysite, $Al_2(Si_2O_5)(OH)_4$ and halloysite, $Al_2(SiO_3)(OH)_3$. Also included among suitable clays are clays of the micaceous group such as hydrous mica, illite and allevardite which contain mica (muscovite) $K \cdot Al_2(AlSi_3O_{10})(OH)_2$, paragonite $Na \cdot Al_2(AlSi_3O_{10})(OH)_2$, phlogopite $K \cdot Mg_3(AlSi_3O_{10})(OH)_2$, biotite $K \cdot (Mg,Fe)_3(AlSi_3O_{10})(OH)_2$, margarite $CaAl_2(Al_2Si_3O_{10})(OH)_2$. Physically, bentonite is characterized by "sandwiched" layers of silicate and alumina layers while in clays of the kaolin and micaceous groups these layers are alternate but not sandwiched. The clays of the kaolin group are substantially free of sodium and magnesium while bentonite contains sodium and magnesium. For purposes of this invention, fly ash may be combined with clay or with diatomaceous earth plus clay to form the pozzolan component of the composition of this invention, but in any event it is necessary that fly ash and clay be present. While the proper percentage range of the pozzolan component is approximately 10 to 50 percent by weight of the total mixture, at least 5 percent by weight of the total mixture must consist of fly ash.

The plasticizer comprising another component of our composition is a clay selected from the montmorillonite group, such as the South Dakota, Wyoming or Black Hills bentonites, which contain minerals such as montmorillonite $Al_2(Mg)(Si_4O_{10})(OH)_2 \cdot XH_2O$, nontronite $Fe_2(Mg)(Si_4O_{10})(OH)_2 \cdot XH_2O$, beidellite $$Al_2(Mg)(Si_4AlO_{10})(OH)_2 \cdot XH_2O$$

and saponite $Mg_3(Si_4(Mg)O_{10})(OH)_2 \cdot XH_2O$.

The ingredients of the composition of this invention may be combined in widely varying proportions as heretofore outlined, and the manner in which the ingredients are blended, as well as the order of their inclusion into the blend, is subject to considerable variation. However, it is preferred to mix the solid ingredients and then add water in a suitable amount to establish the proper consistency, which may readily be determined by those familiar with the mixing of cementitious compositions, after which the mixture is in a trowelable form and may be applied to pipes, tanks, or other metallic or non-metallic surfaces.

The following specific examples further illustrate compositions in accordance with this invention. The examples which follow are intended to be illustrative, and are not intended to apply any limitation to the scope of the invention, which is defined in the claims.

EXAMPLE 1

| Ingredient | Percent by weight |
|---|---|
| White Portland Cement | 21.6 |
| Clay (Kaolin) | 15.4 |
| Diatomaceous Earth | 5.4 |
| Fly Ash | 16.4 |
| Bentonite | 13.9 |
| Mineral Wool | 27.3 |

This is a preferred composition. It has excellent qualities of workability, ideal setting properties, resistance to expansion and contraction, excellent thermal properties, stability to weather conditions, and an attractive white color.

EXAMPLE 2

Reference may be had to the following table, which shows a plurality of examples of suitable compositions in accordance with this invention.

*Percent by weight*

| Ingredient | I | II | III | IV | V | VI | VII | VIII | IX |
|---|---|---|---|---|---|---|---|---|---|
| White Portland Cement | 15 | 18 | 15 | 30 | 10 | 10 | 35 | 15 | 30 |
| Clay | 20 | 5 | 15 | 25 | 15 | 20 | 15 | 30 | 5 |
| Diatomaceous earth | 6 |  | 5 | 1 |  | 5 | 2 | 5 |  |
| Fly Ash | 22 | 10 | 15 | 5 | 25 | 20 | 10 | 10 | 5 |
| Bentonite | 17 | 27 | 20 | 5 | 15 | 20 | 18 | 10 | 30 |
| Mineral Wool | 20 | 40 | 30 | 34 | 35 | 25 | 20 | 30 | 30 |

It has been found in accordance with this invention, extensive tests in an effort to ascertain the nature of the reaction which takes place in eliminating the dark gray color. However, our experiments have indicated only that the removal of any required ingredient or combination of two ingredients from the composition (exclusive of the fly ash which is principally responsible for the grayness of the composition) changes the product from white to gray. (The diatomaceous earth is not a required ingredient and has little effect on color in the quantities used. Diatomaceous earth, where used, decreases the density of the product.) In fact the following tests clearly indicate that the removal of a single ingredient other than fly ash (or diatomaceous earth) from the mixture produces a gray product in contrast to the white composition containing all ingredients.

TABLE 1.—COMPARATIVE REFLECTION TESTS OF SAMPLES WITH OMISSION OF INDIVIDUAL PRIMARY INGREDIENTS

| Sample | Fly Ash, Percent by wt. | Clay, Percent by wt. | Diatomaceous Earth | White Portland Cement, Percent by wt. | Bentonite, Percent by wt. | Sand, Percent by wt. | Color |
|---|---|---|---|---|---|---|---|
| Control 104 P | 16.4 | 15.4 | 5.4 | 21.6 | 13.9 | 27.7 | White. |
| 104 S | ¹ none | 15.4 | 5.4 | 21.6 | 13.9 | 43.7 | White. |
| 104 R | 16.4 | 15.4 | 5.4 | ¹ none | 13.9 | 49.9 | Gray. |
| 104 Q | 16.4 | ¹ none | 5.4 | 21.6 | 13.9 | 42.7 | Gray. |
| 104 O | 16.4 | 15.4 | ¹ none | 21.6 | 13.9 | 32.7 | Gray. |
| 104 N | 16.4 | 15.4 | 5.4 | 21.6 | ¹ none | 41.2 | Gray. |

¹ Ingredient removed: percent added as sand.

After comparing the colors in the right hand column of the above table, it will be observed that the removal of fly ash which is dark gray in color, leaves a product having a white color. However, fly ash is an extremely important ingredient of this composition, and its removal destroys the important properties thereof. It will further be observed that when any other component of the composition is removed, the resulting mixture is much darker than sample 104 P, which is the visible equivalent of a preferred composition in accordance with this invention, although sand was substituted for mineral wool in order to give better trowelability to some samples which would otherwise have been impossible to prepare for color determination tests. In no case is the composition made any whiter by leaving out a single ingredient other than fly ash.

The following examples indicate that compositions in accordance with this invention cannot be made whiter by omitting various combinations of ingredients:

TABLE 2.—COMPARATIVE REFLECTION TESTS OF SAMPLES WITH OMISSION OF COMBINATIONS OF INDIVIDUAL PRIMARY INGREDIENTS

| Sample | Fly Ash, Percent by wt. | Clay, Percent by wt. | Diatomaceous Earth, Percent by wt. | White Portland Cement, Percent by wt. | Bentonite, Percent by wt. | Sand, Percent by wt. | Color | Reflection (Relative to MgO=100) |
|---|---|---|---|---|---|---|---|---|
| Control 104 P | 16.4 | 15.4 | 5.4 | 21.6 | 13.9 | 27.7 | White | 60 |
| 104 A | 16.4 | ¹ none | ¹ none | 21.6 | ¹ none | 62.0 | Gray | 42 |
| 104 I | 16.4 |  15.4 | ¹ none | ¹ none | ¹ none | 68.2 | Gray | 38 |
| 104 J | 16.4 | ¹ none | 5.4 | ¹ none | ¹ none | 78.2 | Gray | 38 |
| 104 K | 16.4 | ¹ none | ¹ none | ¹ none | 13.9 | 69.7 | Gray | 42 |
| 104 F | 16.4 | 15.4 | ¹ none | 21.6 | ¹ none | 46.6 | Gray | 42 |
| 104 L | 16.4 | ¹ none | 5.4 | 21.6 | ¹ none | 56.6 | Gray | 46 |
| 104 M | 16.4 | ¹ none | ¹ none | 21.6 | 13.9 | 48.1 | Gray | 50 |
| 104 T | 16.4 | 15.4 | 5.4 | ¹ none | ¹ none | 62.8 | Gray | 50 |
| 104 U | 16.4 | 15.4 | ¹ none | ¹ none | 13.4 | 54.3 | Gray | 38 |
| 104 V | 16.4 | ¹ none | 5.4 | ¹ none | 13.9 | 64.3 | Gray | 38 |

¹ Ingredient removed: percent added as sand.

that although fly ash is present in a rather substantial proportion, and although it has rather a dark gray color, the composition as a whole has a white color after drying, although it is grayish when wet. We have made extensive tests in an effort to ascertain the nature of the The foregoing examples, it will be observed, have included sand rather than mineral wool. The reason for this substitution is that sand produces a mixture which is readily trowelable as distinguished from mineral wool in some compositions even though the percentage of sand in some cases is sufficiently high that trowelability would be impaired using mineral wool. In any event, the substitution of sand for mineral wool has no measurable effect on the percentage of reflection relative to magnesium oxide, which is the measure of the grayness or whiteness of the sample. The reflection values given in the last column were determined by means of a reflection gage according to Patent No. 1,649,964. While numerical values are given it should be noted that the results are qualitative in nature since the measurement of reflection is a function of light source, the characteristic of the surface which is being observed, the angle of observation, and upon the individual making the observation. The important point to note is that the sample 104 P gives a white appearance whereas all of the remaining samples are gray.

In the following tests, dark rock wool was used, this being a specific form of mineral wool.

tions of combined water as indicated in the table which follows:

TABLE 4

| Component | Grams, Material A | | Grams, Material B | | Grams, Material C | |
|---|---|---|---|---|---|---|
| Cement | 43.2 | 43.2 | 30 | 30 | 60 | 60 |
| Clay | 30.8 | 30.8 | 40 | 40 | 50 | 50 |
| Diatomaceous Earth | 10.8 | 10.8 | 12 | 12 | 2 | 2 |
| Fly ash | 32.8 | 32.8 | 44 | 44 | 10 | 10 |
| Bentonite | 27.8 | 27.8 | 34 | 34 | 10 | 10 |
| Mineral Wool | 54.6 | 54.6 | 40 | 40 | 68 | 68 |
| Water in Initial Wet Mixture (grams) | 150.0 | 150.0 | 170 | 170 | 150 | 150 |
| Combined Water, percent by weight based on total solids | 2.9 | 2.8 | 2.6 | 2.85 | 4.83 | 4.71 |

The solid components of the materials of Table 4 were weighed in dry condition, mixed with the indicated quan- TABLE 3.—COMPARATIVE REFLECTION TESTS OF SAMPLES WITH OMISSION OF INDIVIDUAL PRIMARY INGREDIENTS

| Sample | Fly Ash, Percent by wt. | Clay, Percent by wt. | Diatomaceous Earth, Percent by wt. | White Portland Cement, Percent by wt. | Bentonite, Percent by wt. | Dark Rock Wool, Percent by wt. | Reflection (Relative to MgO=100) |
|---|---|---|---|---|---|---|---|
| Control 101— | 16.4 | 15.4 | 5.4 | 21.6 | 13.9 | 27.3 | 70 |
| 101 B | 20.9 | 19.6 | 6.9 | none | 17.7 | 34.8 | 42 |
| 101 E | 19.4 | none | 6.4 | 25.5 | 16.4 | 32.2 | 42 |
| 101 C | 17.3 | 16.3 | none | 22.8 | 14.7 | 28.9 | 60 |
| 101 D | 19.1 | 17.9 | 6.3 | 26.5 | none | 31.3 | 46 |

It will be noted that sample 101— control has a higher reflection value than sample 104 P of Table 2. One reason for this slightly higher value is that the surface of the sample has a somewhat different texture because of the inclusion of rock wool instead of sand. The differences involved are small.

The foregoing examples clearly show that the ingredients of the compositions of this invention co-act with one another to produce a finished composition which is white in color, notwithstanding the fact that fly ash is dark gray and that the removal of any one or two components causes the composition to become gray in color. Accordingly, it will be apparent that the ingredients of the composition in accordance with this invention co-act with one another to produce a highly unexpected and extremely advantageous whitening effect which greatly enlarges the field of use of the composition without adversely affecting its other properties. To our knowledge no comparable insulating finishing cement has been discovered which contains fly ash and has a desirable white color which is readily compatible with the color of conventional magnesia insulation.

The diatomaceous earth, which has been included as a component of some of the compositions of this invention, is not necessarily a required ingredient. In some cases it improves the physical properies of the composition, for example, a reduction in the final density is brought about.

After setting, compositions in accordance with this invention produce a new monolithic insulating structural material consisting essentially by weight of about 20–40% mineral wool, 10–35% setting cement, 10–50% pozzolan component comprising fly ash and clay selected from the group consisting essentially of the kaolin group and the micaceous group, 5–30% montmorillonite clay, and 2–6% combined water, the weight of water being based on the total weight of solids.

Typical monolithic structural materials contain proportity of water, and permitted to set until the setting reaction was complete. The final products were then dried to constant weight. The last row of the table gives the percentage gain in weight of the final material over the initial weight of the dry component solids. Any residual water in the clay components of the dry solids could be only of minor quantity and the total combined water was therefore substantially that shown in the table.

While various finishing cements and insulating cements are known in the prior art, we believe that the present invention is unique and provides the first commercially practicable cement which not only fulfills the color requirements set forth above, but which is also characterized by a combination of insulating and finishing properties together with early setting characteristics, including high early resistance to weather effects such as rainfall. Moreover, cements in accordance with this invention have capacity to adhere tenaciously to smooth metal surfaces or the like, when applied in semi-plastic or pliable form. In addition, cements in accordance with this invention have capacity to expand and contract and therefore resist cracking when they are applied to a metal surface which is alternately heated and cooled.

While this invention has been described with particular reference to specific ingredients and materials, it will be appreciated that equivalent materials may be substituted for the specific ingredients disclosed and that various other modifications may be made without departing from the scope of this invention, which is defined in the appended claims.

Having thus described our invention, we claim:

1. An insulating finishing cement consisting essentially of about 20% to 40% by weight of mineral wool, about 10% to 35% by weight of white Portland cement, about 10% to 50% by weight of pozzolan component comprising fly ash and clay selected from the group consisting of the kaolin clay group and the micaceous clay group, and about 5% to 30% by weight of a montmorillonite clay, said fly ash comprising at least 5% by weight of the total composition.

2. An insulating finishing cement which is white in color consisting essentially of about 20% to 40% by weight mineral wool, about 10% to 35% by weight of white Portland cement which is substantially free of iron, about 10% to 50% by weight of fly ash and clay selected from the group consisting of the kaolin clay group and the micaceous clay group, and about 5% to 30% by weight of a montmorillonite clay, said fly ash comprising at least 5% by weight of the total composition.

3. An insulating finishing cement which is white in color consisting essentially of about 20% to 40% by weight mineral wool, about 10% to 35% by weight white Portland cement, about 10% to 50% by weight pozzolan consisting of fly ash and clay selected from the group consisting of the kaolin clay group and the micaceous clay group, and about 5% to 30% by weight bentonite, said fly ash component of said pozzolan being present in an amount of about 5% to 25% by weight based on the total weight of the composition.

4. A white insulating finishing cement consisting essentially of about 21.6% by weight white Portland cement, about 15.4% by weight clay selected from the group consisting of the kaolin clay group and the micaceous clay group, about 5.4% by weight diatomaceous earth, about 16.4% by weight fly ash, about 13.9% by weight bentonite, and about 27.3% by weight mineral wool.

5. A monolithic insulating structural material consisting essentially by weight of about 20–40% mineral wool, 10–35% white Portland cement, 10–50% pozzolan component comprising fly ash and clay selected from the group consisting of the kaolin clay group and the micaceous clay group, 5–30% montmorillonite clay, and 2–6% combined water, said fly ash comprising at least 5% by weight of the total weight of solids and the weight of water being based on the total weight of solids.

6. An insulating finishing cement which is white in color consisting essentially by weight of about 10 to 35% white Portland cement, about 5 to 30% clay selected from the group consisting of the kaolin clay group and the micaceous clay group, about 1 to 6% diatomaceous earth, about 5 to 25% fly ash, about 5 to 30% bentonite, and about 20 to 40% mineral wool.

References Cited in the file of this patent
UNITED STATES PATENTS

| | | |
|---|---|---|
| 2,446,990 | Schuetz | Aug. 10, 1948 |
| 2,463,561 | Riley | Mar. 8, 1949 |
| 2,527,766 | Rule | Oct. 31, 1950 |
| 2,574,843 | Randall | Nov. 13, 1951 |